United States Patent [19]

Colanzi et al.

[11] Patent Number: 4,728,204
[45] Date of Patent: Mar. 1, 1988

[54] TAPER ROLLER BEARING, PARTICULARLY FOR RAILWAY USE

[75] Inventors: Franco Colanzi, Turin; Bruno Pizzi, San Mauro Torinese, both of Italy

[73] Assignee: Riv-SkF Officine di Villar Perosa S.p.A., Italy

[21] Appl. No.: 927,797

[22] Filed: Nov. 5, 1986

[30] Foreign Application Priority Data

Nov. 22, 1985 [IT] Italy .................. 67982 A/85

[51] Int. Cl.$^4$ .................. F16C 33/58; F16C 33/46; F16C 33/56
[52] U.S. Cl. .................. 384/572; 384/564; 384/576; 384/580
[58] Field of Search .............. 384/571, 572, 576, 580, 384/564

[56] References Cited

U.S. PATENT DOCUMENTS

| 2,969,266 | 1/1961 | Schaeffler | 384/564 |
| 3,477,773 | 11/1969 | Altson | 384/576 |
| 3,694,043 | 9/1972 | Tellson | 384/578 |
| 3,767,278 | 10/1973 | Knowles | 384/575 |
| 3,940,193 | 2/1976 | Molloy | 384/580 |
| 4,136,916 | 1/1979 | Musselman et al. | 384/576 X |
| 4,222,620 | 9/1980 | Mirring | 384/576 |
| 4,523,862 | 6/1985 | Yasui et al. | 384/571 X |
| 4,629,339 | 12/1986 | Morinaga | 384/576 |

FOREIGN PATENT DOCUMENTS

| 1286343 | 1/1969 | Fed. Rep. of Germany | 384/564 |
| 1143860 | 10/1957 | France | 384/580 |
| 50224 | 3/1984 | Japan | 384/576 |
| 271865 | 11/1927 | United Kingdom | 384/572 |
| 2112085 | 7/1983 | United Kingdom | 384/564 |

Primary Examiner—Stuart S. Levy
Assistant Examiner—Thomas R. Hannon
Attorney, Agent, or Firm—Steele, Gould & Fried

[57] ABSTRACT

A taper roller bearing is described which has the particular feature of having the track of the inner ring capable of being inspected, such characteristic is obtained by means of a spacer cage the bridges of which extend both above and below the roller pitch circle identified by the axes of the rollers in such a way as to retain these latter in the pockets of the cage both on the outer ring side and on the inner ring side of the bearing; the cage in the pockets of which the rollers are snap-engageable, is removable together with the rollers of the track of the inner ring, being axially fixed to this latter by snap-engagement.

6 Claims, 5 Drawing Figures

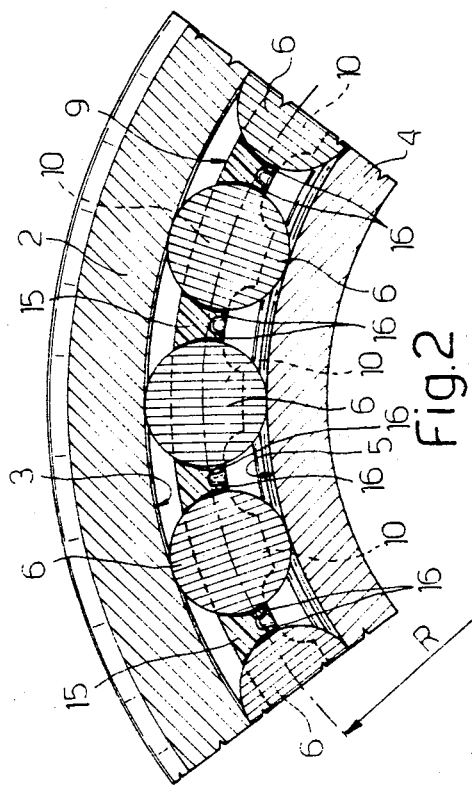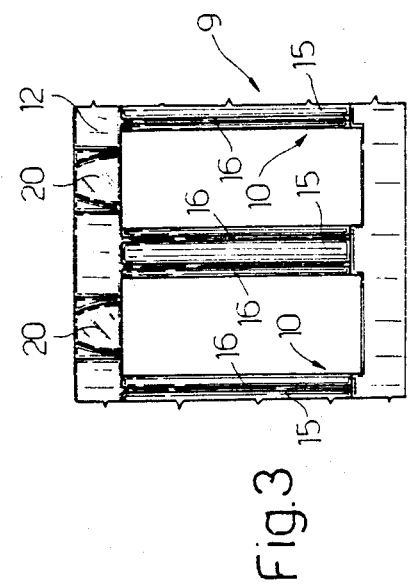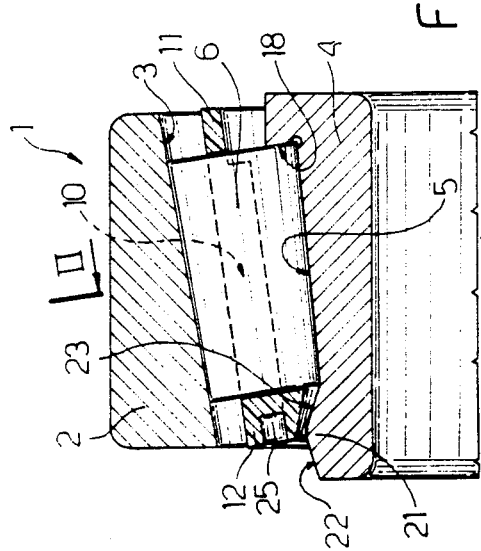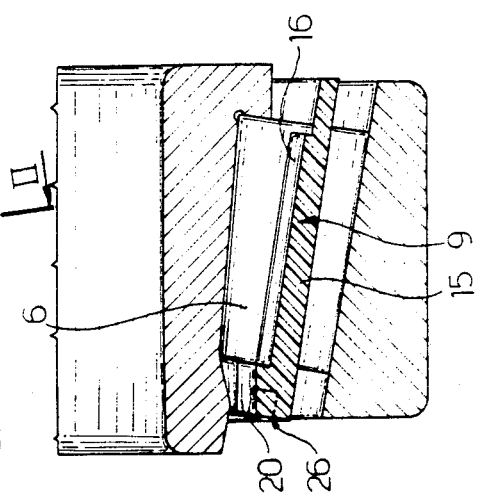

TAPER ROLLER BEARING, PARTICULARLY FOR RAILWAY USE

BACKGROUND OF THE INVENTION

The present invention relates to a rolling element bearing of the taper roller type, particularly for railway use, in which the inner ring can be inspected in use.

It is known that in taper roller bearings currently in use it is not possible to remove the rollers from the track of the inner ring once assembly has been effected, at least not without breaking the spacer cage which is usually made of metal or plastics, and which holds these in position; during periodic maintenance and lubrication operations to which taper roller bearings of railway axles are subjected, it is therefore impossible for the user effectively to check on the state of wear of the inner ring and the associated track; therefore possible anomalous wear states cannot be detected and there is the dangerous risk of breakage in use, which can have serious consequences given the high speeds of modern trains. To avoid this disadvantage bearings for railway use are replaced frequently, but this causes considerable increases in the operating costs in that, for reasons of safety, the bearings have to be replaced well before the theoretical operating limit thereof, that is to say when the bearings are, for the most part, still a long way from being dangerously worn.

SUMMARY OF THE INVENTION

The object of the present invention is that of providing a taper roller bearing, particularly for railway use, the structure of which is such as to permit, after the bearing has been assembled for use, periodic testing of the state of wear of the inner ring, in a simple and rapid manner by removal of the rollers.

The said object is achieved by the invention in that it relates to a rolling element bearing of taper roller type, particularly for railway use, comprising an outer ring provided with an associated inner conical track, an inner ring provided with an associated outer conical track, a plurality of taper rollers disposed freely between the said inner and outer rings and guided between the said tracks, and a spacer cage interposed between the said inner and outer rings and comprising a larger and a smaller end ring, and a plurality of rectilinear bridges connecting the said end rings together and disposed equidistantly and adjacent along a generatrix of a conical surface in such a way as to define, with the said end rings, respective pockets able to house the said taper rollers freely, and operable to maintain them spaced from one another and with their axes of rotation disposed in a ring around a circumference, characterised by the fact that the said bridges extend both above the said circumference, in such a way as to retain the said rollers in the pockets on the outer ring side of the bearing, and below the said circumference, in such a way as to retain the said rollers in the pockets on the inner ring side of the bearing also, the said pockets being able to snap-receive the said conical rollers and at least the said inner ring of the bearing including means for axially fixing the said cage by snap-engagement, with the rollers housed in the pockets, to the said inner ring.

BRIEF DESCRIPTION OF THE DRAWINGS

For a better understanding of the invention there is now given a non-limitative description of its embodiments with reference to the attached drawings, in which:

FIG. 1 illustrates a section view of a bearing formed according to the invention;

FIG. 2 illustrates a section taken on the line II—II of a portion of the bearing of FIG. 1;

FIG. 3 is a radially inner circumferential view of a detail of the bearing of FIG. 1;

DETAILED DESCRIPTION OF THE INVENTION

Figure 5:
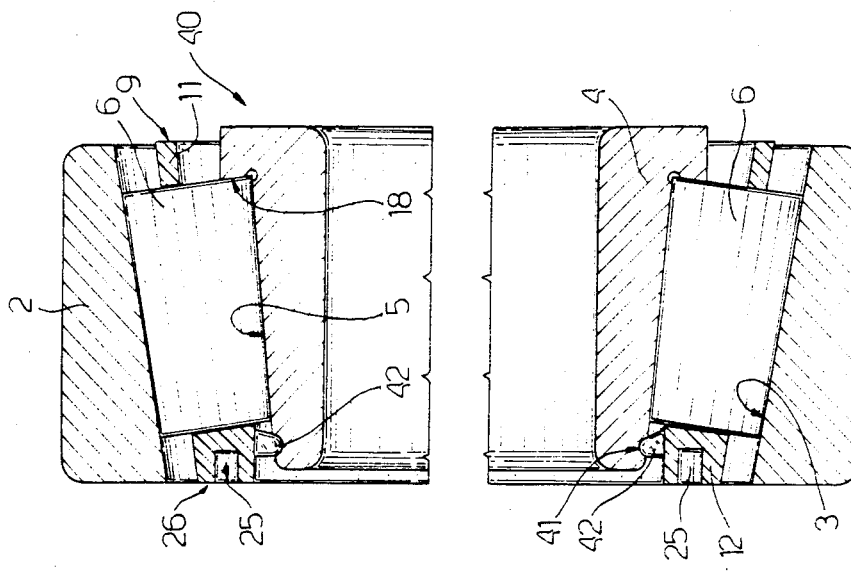
FIG. 5 illustrates a variant of the invention.

Making reference to FIGS. 1, 2, 3 and 4, a rolling element bearing of the taper roller type is generally indicated with the reference numeral 1, this bearing being particularly adapted for railway use and comprising an outer ring 2 having on its radially inner face a conical track 3, a inner ring 4 provided on its radially outer face with a conical track 5 facing the track 3, a plurality of taper rollers 6 freely disposed between the rings 2 and 4 in such a way as to make them rotatable with low friction with respect to one another and guided between the inner conical track 3 and the outer conical track 5 of the rings 2 and 4 respectively, and a spacer cage 9 interposed between the rings 2 and 4 and freely carrying the rollers 6 disposed in a ring at regular intervals within respective pockets 10 each of which freely houses a respective taper roller 6 in such a way that these latter are separated from one another and held with their respective axes of rotation disposed in a ring along the generatrices of a conical surface coaxial with the tracks 3 and 5. By taking a section through the bearing 1 along the plane II—II or any plane parallel thereto, therefore, the axes of the rollers 6 can be seen disposed in a ring along a circumference of radius R indicated in dot and dash line in FIG. 2, known in this branch of the art as the roller pitch circle of the bearing 1.

The cage 9, which is preferably made by moulding in synthetic plastics material, comprises a pair of outer rings 11 and 12, respectively larger and smaller rings, in that the ring 11 has a greater diameter than that of the ring 12, and a plurality of rectilinear bridges 15 connecting the rings 11 and 12 together and disposed equidistantly and adjacently along the generatrices of a conical surface concentric with the tracks 3 and 5, in such a way as to define, with the rings 11 and 12, the pockets 10.

According to the invention the cage 9 can house the rollers 6 independently of whether these are supported by the track 5 of the inner ring 4, in that the bridges 15 (FIGS. 1 and 2) extend both above the said pitch circle in such a way as to retain the rollers 6 in the pockets 10 on the side towards the outer ring 2, and beneath the pitch circle, in such a way as to retain the rollers 6 in the pockets 10 also on the side towards the inner ring 4; in this way the rollers 6, once housed in the pockets 10, are retained within these against the effect of their own weight and/or against any radial stresses, even if the cage 9 is not inserted between the rings 2 and 4. In particular, the bridges 15 have in transverse section a trapezoidal shape having the major base facing towards the ring 2, in such a way as to determine a restriction of the pockets 10 on the side of the track 3 and consequently to retain the rollers 6 against the effect of centrifugal forces, and are provided, beneath the pitch circle, with respective opposite radial off-set tongues 16 disposed adjacent one another and extending in such a way as to project from the opposite longitudinal edges of the bridges 15 towards the axes of the cage 9, in such a way as to cause a restriction of the pockets 10 also on the side towards the track 5 and consequently to retain the rollers 6 against the effect of centripetal forces. To allow the introduction of the rollers 6 into the pockets 10 the tongues 16, which are preferably integrally formed with the bridges 15, are resiliently deformable and are shaped in such a way that they are able to cooperate with the rollers 6 to be moved apart by these under the thrust of a force of pre-determined magnitude; therefore the pockets 10 are able to receive and snap-engage the rollers 6 and therefore to retain them freely with a force such as to allow at least the free manipulation of the cage 9 without any roller 6 escaping from its seat. In order to optimise the behaviour of the tongues 16 with the conical rollers 6, moreover, these extend in an axial sense, starting from the ring 12, up to a pre-determined relatively small distance (for example 1–2 millimeters) from the ring 11, in such a way as to be fixed on the smaller ring 12 and therefore have high rigidity on the side of this latter, and on the other hand, to be free of the larger ring 11, of smaller thickness than that of the ring 12, and therefore be more flexible on the side of the ring 11 itself, such that the rollers 6 can be inserted into the pockets 10 with an axial movement from the ring 11 towards the ring 12.

Figure 4:
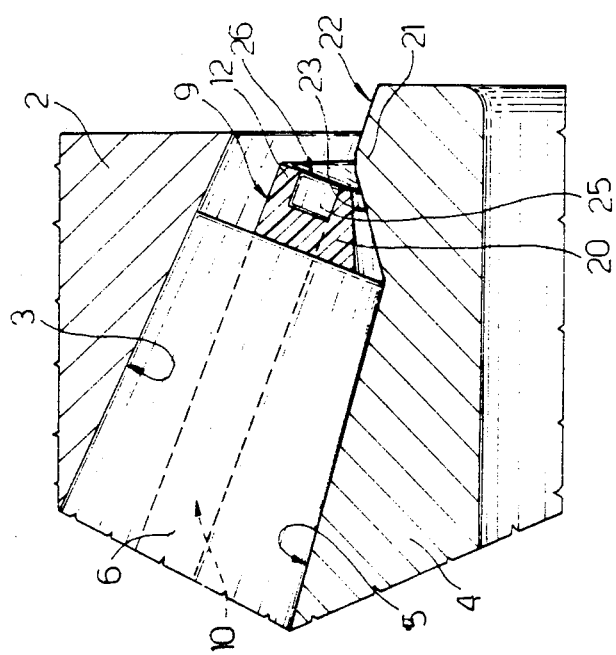
FIG. 4 illustrates on an enlarged scale a further detail of the bearing of FIG. 1.

As illustrated in FIGS. 3 and 4, to allow the rapid assembly and dismantling of the cage 9 from the bearing 1, even with the rollers 6 inserted in the pockets 10, the axial retention of the rollers 6 and the cage 9 on the side of the ring 12 is effected, rather than with a rigid shoulder as in known bearings, with snap-engagement means, whilst on the side of the ring 11 the rollers 6 are retained in a conventional manner by a shoulder 18 of the inner ring 4. In particular, in a preferred embodiment of the invention, the cage 9 is made in such a way as to be resiliently deformable in a circumferential sense and is provided on the ring 12 with a plurality of radially inner projections 20 formed adjacent one another and extending in a direction substantially perpendicular to the axis of the ring 12. The inner ring 4 is provided with an annular rib 21 formed adjacent the track 5 and extending towards the track 3 for a distance such as to cause interference with the rollers 6; the rib 21 is provided with opposite conical ramp inclines 22 and 23 which are able to cooperate with the rollers 6 as a consequence of the application of an axial thrust on the cage 9 directed towards the rib 21, to press these radially outwardly against the upper rigid part of the bridges 15 and consequently circumferentially to deform the cage 9 by an amount such as to allow the snap-insertion of the cage 9 beyond the rib 21 itself. Preferably the cage 9 is made of a semi-rigid plastics material, resiliently deformable in a circumferential sense, for example nylon, but its relative circumferential deformability is encouraged by means of a suitable design of the rings 11 and 12 and the bridges 15; in particular the ring 12 is provided with projections 20 each formed between a pair of adjacent bridges 15 and, in correspondence with each pocket 10, is further provided with respective frontal cavities 25 formed on one face 26, opposite that facing towards the rollers 6, immediately beneath the projections 20 and in correspondence with the whole of the basal extension of these. In this way the ring 12, which also defines the abutment shoulder for the rollers 6, is sufficiently rigid to retain the rollers 6 within the pockets 10, through the tongues 16, and at the same time is sufficiently deformable to become enlarged during assembly and dismantling by the pressure exerted by the rollers 6 by an amount sufficient to allow these and the cage 9 to "jump" the annular rib 21 and therefore permit the cage 9 to be fitted to or released from the inner ring 4.

In use, during the periodic dismantlings for maintenance, it is therefore possible to inspect the state of wear of the track 5 in a simple and rapid manner; in fact, once the outer ring 2 has been removed in a conventional manner the rollers 6 are retained on the ring 4 solely by the cage 9 and this latter is retained solely by the rib 21 through the rollers 6, which cooperate axially therewith; by gripping the ring 12 manually or with a suitable tool (or else by exerting a thrust against the ring 11 directed towards the rib 21), it is therefore possible to press the rollers 6 housed in the pockets 10 against the rib 21 with a predetermined force making these cooperate with the ramp incline 23; this transforms the axial thrust exerted by the user into a radial thrust exerted by the rollers 6 on the cage 9 in a circumferentially equally divided manner, which thrust produces progressive deformation of the rings 11 and 12 in such a way as resiliently to enlarge the diameters thereof until they reach a value sufficient to make possible a radial centrifugal displacement of the rollers 6 by an amount such as to overcome the interference of the rib 21 and therefore permit the monolithic assembly constituted by the cage 9 and the rollers 6 housed in it to pass over the rib 21; once it has passed over the rib 21 the resilient recovery of the cage 9 causes immediate return of the rings 11 and 12 to the original diameter causing the cage 9 to be ejected with a snap from the ring 4 by the action of the centripetal radial thrust which is exerted at this point by the rollers 6 on the outer ramp 22. During the dismantling operation described the rollers 6 are therefore translated, together with the cage 9 and climb over the rib 21 remaining retained in the pockets 10 by the action of the bridges 15 which, however, by reaction, become separated in a radial sense from one another causing deformation of the rings 11 and 12. Once removal has been effected all the rollers 6 are carried only by the cage 9 and can be removed, together with this, from the bearing 1 thus leaving the ring 4 completely free for inspection. If one or more of the rollers 6 are worn, these can even be replaced by extracting them from the pockets 10 by resilient deformation of the tongues 16. Finally, when inspection has been terminated, the rollers 6 can be replaced with a single operation, together with the cage 9, simply by axially pressing the cage 9 towards the shoulder 18 after having fitted it onto the ring 4; this time the rollers 6 cooperate first with the ramp 22 to cause deformation of the cage 9 and allow its introduction onto the track 5 on the other side of the rib 21, and then cooperate with the ramp 23 during the resilient return phase of the cage 9 causing the snap-introduction of it onto the ring 4 beyond the rib 21.

Referring now to FIG. 5, there is shown a bearing generally indicated 40 which is entirely analogous to the bearing 1, from which it differs by the snap-locking system of the cage 9 on the ring 4; the details which are similar to or the same as those already described are indicated for simplicity with the same reference numerals. In particular, the ring 4 does not have an annular rib 21 or any other type of projection or abutment shoulder for stopping the rollers 6 moving towards the ring 12, and is instead provided with an annular seat 41 formed in a position adjacent to the track 5 in place of the rib 21;

the ring 12 is preferably devoid of lightening and elasticating projections 20, and is instead provided on its radially inner side with one or more resiliently deformable teeth 42, preferably formed in correspondence with the frontal cavities 25. In this embodiment the abutment shoulder for stopping the rollers 6 moving towards the seat 41 is defined by the same ring 12 which is substantially rigid and undeformable; the cage 9 is also made in such a way that it has a greater rigidity than that of the cage in the bearing 1, in that there is no projection to overcome for introduction of the cage 9 onto the ring 4 of the bearing 40. In use one will operate in the manner described for the bearing 1, with the single difference that the axial forces to which the cage 9 and the rollers 6 are subjected to effect its assembly or dismantling from the ring 4, this time will resiliently deform the teeth 42 causing the flexure thereof and, consequently, the snap-engagement or release in or from the seat 41; when, on the other hand, the teeth 42 are engaged in the seat 41 these axially retain the cage 9, the axial thrust in use, being absorbed by the outer ring 2.

From what has been described the advantages connected with the bearing according to the invention are apparent, and it is clear that there can be introduced variations and modifications thereto without by this departing from the scope of the invention.

We claim:

1. A rolling element bearing (1,40) of a taper roller type, particularly for railway use, comprising:

an outer ring (2) having an associated inner conical track, an inner ring (4) having an associated outer conical track, a plurality of taper rollers (6) freely disposed between said inner and outer rings and guided between said tracks, and a spacer cage (9) interposed between said inner and outer rings, the spacer cage having a pair of end rings (11, 12) respectively being a larger ring (11) and a smaller ring (12), and a plurality of rectilinear bridges (15) connecting said end rings together and being disposed equidistantly and adjacent along generatrices of a conical surface in such a way as to define, with said end rings, respective pockets (10) for freely housing said taper rollers, and operable to maintain the taper rollers separated from one another and their axes of rotation disposed in a ring along a circumference, said bridges (15) extending both above said circumference in such a way as to retain said rollers (6) in the pockets (10) on a side of the bearing toward the outer ring (2), and beneath said circumference, in such a way as to retain said rollers (6) in the pockets on a side of the bearing toward the inner ring (4) also, and said pockets (10) being adapted to receive and snap-engage said rollers, wherein said cage (9) is made of resiliently deformable synthetic plastic material and wherein said inner ring (4) of the bearing is provided with a conventional shoulder (18) for said rollers (6) on a side adjacent said larger end ring (11) of the cage and with means (21, 41) for axially snap-engaging said cage (9) with the rollers (6) therein to said inner ring (4) on a side adjacent said smaller end ring (12) of the cage, said smaller end ring (12) being provided with respective frontal cavities (25) formed in correspondence with each said pocket (10) on a base of said smaller end ring (12) opposite that directed towards each said roller (6) and said larger end ring (11) being of smaller thickness than the smaller ring (12) so that said cage (9) is made resiliently deformable in a circumferential sense.

2. A bearing according to claim 1, wherein said axial snap-engagement means between the cage and the inner ring of the bearing includes an annular rib (21) of said inner ring (4) formed adjacent to said outer track thereof, which rib extends towards the inner track of said outer ring (2) and is provided with opposite conical ramp surfaces (22, 23) which cooperate with said taper rollers (6) housed in the pockets of the cage (9) in order circumferentially to deform the cage (9) by an amount such as to permit the snap-insertion thereof beyond said rib (21) together with said rollers (6).

3. A bearing according to claim 2, wherein said cage (9) is made from a semi-rigid synthetic plastics material which is resiliently deformable in a circumferential sense.

4. A bearing according to claim 2, wherein said cage (9) includes respective radially inner projections (20) formed on said smaller end ring (12) each lying between a pair of adjacent ones of said bridges (15): said cavities (25) formed frontally on said smaller end ring (12) being provided immediately under said radially inner projections (20).

5. A bearing according to claim 1, wherein said axial snap-engagement means between the cage (9) and the inner ring of the bearing (4) include at least one resiliently deformable tooth (42) formed on the radially inner side of said smaller end ring (12) of the cage (9), and at least one seat (41) for said tooth (42) formed in a position adjacent said outer track on the inner ring (4) of the bearing, the inner ring being free from any stop shoulder for the rollers (6) on a side of the seat (41), which is defined by said smaller end ring (12) of the cage (9).

6. A bearing according to claim 1, wherein said bridges (15) of the cage (9) are provided, beneath a circumference along which axes of the rollers (6) are disposed in a ring, with adjacent opposite, resiliently deformable, adjacent radial tongues (16) adapted to cooperate with rollers (6) and extending in an axial sense from said smaller of the end rings (12) of the cage up to a predetermined relatively small distance from the larger (11) of said rings.

* * * * *